(12) United States Patent
Yilmaz et al.

(10) Patent No.: US 10,827,426 B2
(45) Date of Patent: Nov. 3, 2020

(54) METHODS AND APPARATUSES FOR MONITORING A RADIO LINK

(71) Applicant: Telefonaktiebolaget LM Ericsson (publ), Stockholm (SE)

(72) Inventors: Osman Nuri Can Yilmaz, Espoo (FI); Andreas Höglund, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 305 days.

(21) Appl. No.: 15/580,398

(22) PCT Filed: Jun. 9, 2015

(86) PCT No.: PCT/EP2015/062861
§ 371 (c)(1),
(2) Date: Dec. 7, 2017

(87) PCT Pub. No.: WO2016/198098
PCT Pub. Date: Dec. 15, 2016

(65) Prior Publication Data
US 2020/0037242 A1 Jan. 30, 2020

(51) Int. Cl.
*H04W 52/02* (2009.01)
*H04W 76/19* (2018.01)
*H04W 76/28* (2018.01)
*H04W 24/02* (2009.01)

(52) U.S. Cl.
CPC ....... *H04W 52/0216* (2013.01); *H04W 24/02* (2013.01); *H04W 76/19* (2018.02); *H04W 76/28* (2018.02)

(58) Field of Classification Search
CPC . H04W 52/0216; H04W 76/19; H04W 24/02; H04W 76/28
See application file for complete search history.

(56) References Cited

U.S. PATENT DOCUMENTS

| | | | |
|---|---|---|---|
| 2014/0051429 A1* | 2/2014 | Jung | H04W 24/08 455/422.1 |
| 2016/0007252 A1* | 1/2016 | Larmo | H04W 36/0088 370/332 |
| 2016/0295439 A1* | 10/2016 | Yang | H04W 24/10 |

FOREIGN PATENT DOCUMENTS

WO WO 2014/137259 A1 9/2014

OTHER PUBLICATIONS

Invitation to Pay Additional Fees and, Where Applicable, Protest Fee for PCT International Application No. PCT/EP2015/062861 dated Jan. 25, 2016, 7pp.
International Search Report and Written Opinion of the International Searching Authority for PCT International Application No. PCT/EP2015/062861 dated Jan. 18, 2016, 15pp.
(Continued)

*Primary Examiner* — Afshawn M Towfighi
(74) *Attorney, Agent, or Firm* — Sage Patent Group

(57) ABSTRACT

A method for monitoring a radio link between a base station and a terminal in a wireless communication system includes adapting at least one parameter, which is used in monitoring the radio link, based on a duration of an inactive phase in which the terminal is not transmitting to and/or receiving data from the base station via the radio link.

33 Claims, 8 Drawing Sheets

(56) References Cited

OTHER PUBLICATIONS

3GPP, Technical Specification—"3rd Generation Partnership Project; Technical Specification Group Radio Access Network; LTE; Evolved Universal Terrestrial Radio Access (E-UTRA); Radio Resource Control (RRC); Protocol specification (Release 12)", 3GPP TS 36.331 V12.3.0 (Sep. 2014), 383 pp.

Ericsson et al., "Mobility for enhanced coverage MTC UE", Agenda Item: 7.2.4.2, Document for: Discussion and Decision, 3GPP TSG-RAN WG1 Meeting #74, R1-133425, Barcelona, Spain, Aug. 19-23, 2013, 2 pp.

Catt, "The Initial Impact Analysis on RAN for Extended DRX", Agenda Item: 7.10, Document for: Discussion and Decision, 3GPP TSG RAN WG2 Meeting #90, R2-152131, Fukuoka, Japan, May 25-29, 2005, 4 pp.

Ericsson et al, "Introduction of T312," Change Request—36.331, CR 1436, rev 1, Current version: 12.0.0., 3GPP TSG-RAN WG2 Meeting #85, Prague, Czech Republic, Feb. 10-14 2014 R2-141023, 15 pages.

* cited by examiner

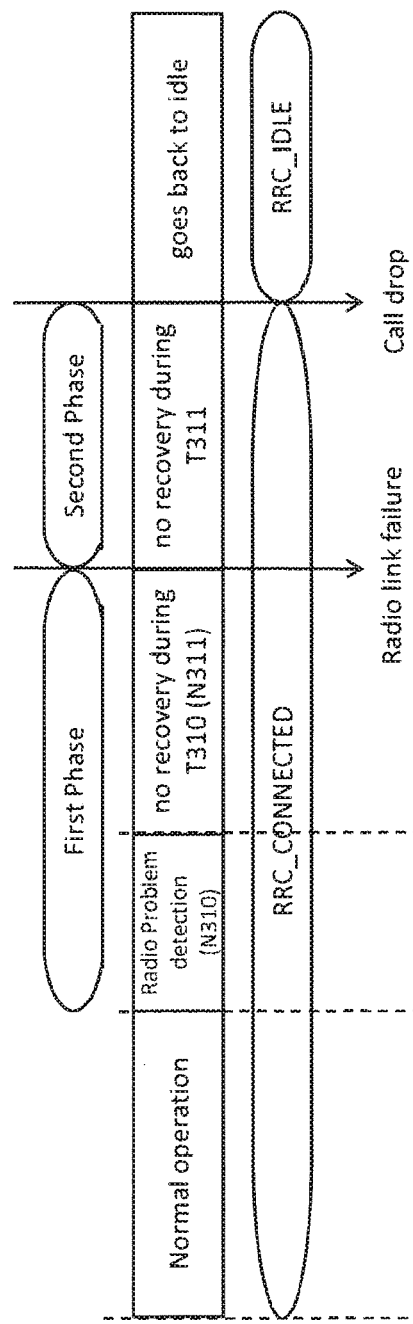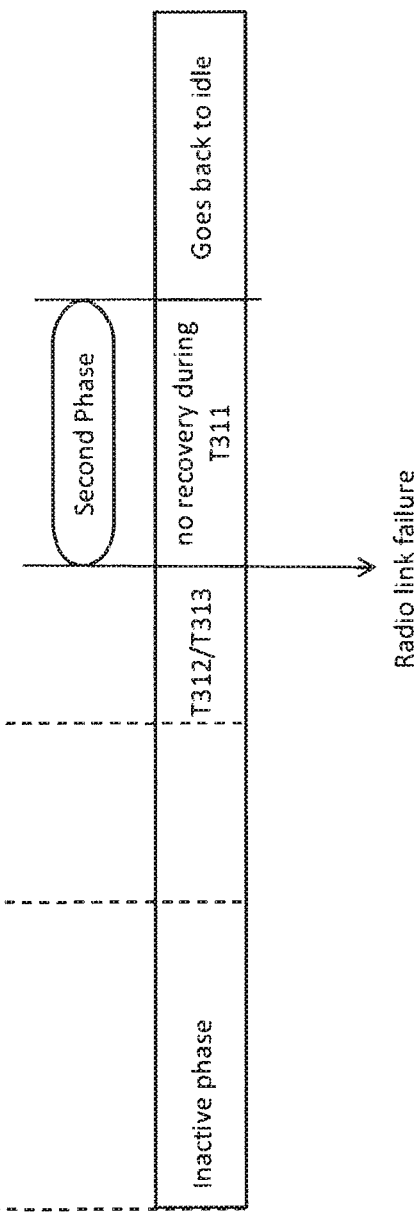
Fig. 2a                    Fig. 2b

METHODS AND APPARATUSES FOR MONITORING A RADIO LINK

CROSS REFERENCE TO RELATED APPLICATION

This application is a 35 U.S.C. § 371 national stage application of PCT International Application No. PCT/EP2015/062861, filed on Jun. 9, 2015, the disclosure and content of which is incorporated by reference herein in its entirety.

TECHNICAL FIELD

The present invention relates to the field of radio link monitoring in a wireless communication system, such as a cellular network, and, more particularly, to a method and a terminal for monitoring a radio link failure between the terminal and a base station (e.g. a serving base station) in a wireless communication system, such as a cellular network. A terminal capable of monitoring a radio link and a base station for enabling a terminal to monitor a radio link as well as computer programs are also described herein.

BACKGROUND

The 3rd Generation Partnership Project (3GPP) is responsible for the standardization of the UMTS (Universal Mobile Telecommunication Service) system and LTE (Long term Evolution). LTE is a technology for realizing high-speed packet-based communication that can reach data rates of about 100 Mbps on the downlink and about 50 Mbps on the uplink. The base station in LTE, also known as eNB (enhanced Node B) or eNodeB, performs the functions of a conventional radio access network (RNC) node and of a UMTS Node B. In addition, eNodeBs in LTE may interact directly with the core network and with other eNodeBs.

Irrespective of the wireless or mobile communication system used, radio link monitoring is vital to maintain radio connections. By regularly reporting the radio conditions, different types of actions can be taken when radio link failures occur. In e.g. UTRA (UMTS Terrestrial Radio Access Network), the physical layers estimate the quality of the radio links and report, on radio frame basis, the synchronization status to higher layers. The synchronization status are reported via so called synchronization primitives which are described in greater details in the technical specification 3GPP TS 25.214 V12.2.0 titled: "Physical Layer Procedures (FDD)".

The mechanism of reporting radio link quality status is also specified in E-UTRA (Evolved UTRA), in which a fast and reliable detection of radio problems is considered essential in order to avoid unnecessary interference in uplink, waste of resources in downlink and unnecessarily long delays before e.g. cell reselection or handover of a terminal can take place.

The radio link failure handling in E-UTRA is described in the technical specifications 3GPP TS 36.300 V12.5.0 titled: "E-UTRA and Evolved Universal Terrestrial Radio Access Network (E-UTRAN) Overall description; Stage 2". The handling of radio link failures described in these specifications consists of two phases as illustrated in FIG. 2a. As shown, the first phase is started upon radio problem detection which may lead to radio link failure detection e.g. after a timer period has expired (the timer is denoted T310 in FIG. 1). In this first phase, user mobility is still controlled and managed by the network. This means the network may perform a handover.

As also shown in FIG. 2a, the second phase is started upon radio link failure detection which may lead to a so called radio resource control (RRC) state transition from a connected mode, i.e. RRC_CONNECTED, to an idle mode, i.e. RRC_IDLE, after the expiry of e.g. a timer, denoted T311 in FIG. 2a. In this second phase, the network loses control over the terminal. Therefore the terminal autonomously may take mobility related decisions in accordance with the specified terminal behavior, cf. section 10.1.6 of above mentioned TS 36.300 V12.5.0.

As mentioned earlier, the judgment (and reporting) of radio problem detection, as well as procedures for its reporting, is handled by the physical layer. The analogy with UTRA refers to the use of the previously mentioned synchronization primitives, e.g. the out of synchronization (out-of-sync) handling.

As an example, for E-UTRA downlink, the terminal monitors radio link quality of the serving base station (or serving cell), in RRC connected (RRC_CONNECTED) mode, in order to indicate radio problems to higher layers. If the terminal is not operating in a so called discontinuous reception mode (DRX mode), the physical layer in the terminal checks, in every frame, the quality of the radio link measured over certain evaluation duration (e.g. 100 ms or 200 ms or any other suitable value) and compares against defined thresholds denoted Qin and Qout. When the radio quality determined by the terminal is worse (or less) than the threshold Qout, the terminal indicates radio problem or the so called out of synchronization to higher layers. The terminal continues indicating radio problems until the quality becomes better than the threshold Qin. It is the higher layer(s) that triggers the start and stop of monitoring i.e. radio problem detection.

In addition to the above mentioned thresholds used to detect radio link problems, there are additional so called higher layer filtering parameters that can be used in order to further increase the reliability of radio link failure detection especially for the cases where the terminal applies DRX and can avoid "ping-pong" between in-synchronization and out-of-sync. These parameters are known as hysteresis counters and timers. It should be noted that additional parameters and coefficients can also be used, but typically timers and counters are used. As an example, UTRA relies on timers and counters, denoted in 3GPP TS 25.331 V12.5.0 by N313 (Successive Out-Of-Sync Reception Max) and N315 (Successive In-Sync Reception Counter). These are configured by higher layers i.e. via the network. They generally count the number of out-of-sync and in-sync indications. For E-UTRA, higher layer filtering parameters such as timers and counters are e.g. described in the technical specification 3GPP TS 36.331 V12.5.0 entitled: "E-UTRA Radio Resource Control (RRC); Protocol specification (Release 12)". One of the timers mentioned in this technical specification and which relates to radio link failure detection and actions to be performed is denoted T310.

As mentioned before, the E-UTRA allows operation in DRX mode in RRC connected mode. DRX is an ongoing work on the LTE network (i.e. on E-UTRAN), and is a mechanism defined to save battery time and resources of a terminal. With DRX a terminal can turn on and off reception of layer 1/layer 2 (L1/L2) control in radio resource control connected state or connected mode, i.e. when the terminal has established an RRC connection with the serving network.

In order to save battery time, the RRC connected mode terminal, while being in sleep mode ('OFF time') during a predetermined DRX cycle period, wakes up at specific timings in order to check/monitor for possible control channels allocated by the base station (e.g. eNB) to determine if there is data to receive, the so called 'ON time'. When there is no data to receive, the terminal switches to the sleep mode and stays in the sleep mode until the next wake-up time. The control channel checked/monitored by the terminal during the wake-up time is known as PDCCH (Physical Downlink Control Channel). When there is data to receive, the terminal receives the data from the base station and sends a response signal (ACK/NACK) indicating a success or a failure in the reception of the data transmitted. As an example, DRX uses one or two predefined cycles (long and/or short cycles) at the beginning of which the terminal should monitor the PDCCH over a certain amount of TTIs (Transmission Time Interval) under a so called 'ON time'. During the 'ON time', the terminal monitors the PDCCH for PDCCH-subframe(s). The number of consecutive PDCCH-subframe(s) at the beginning of the DRX cycle (i.e. during the Active Time) is known as the "On-duration Timer". The On-duration timer in the beginning of each cycle also defines how long a terminal should monitor the PDCCH and is also based on the system frame number (SFN), specified as an integer offset. The PDCCH can carry both downlink assignments as well as uplink grants scheduled by the base station. It should be noted that the same DRX mechanism is used both for the downlink (DL) and the uplink (UL).

Whether the terminal is awake (i.e. monitors the PDCCH) or is asleep after the On-duration period depends on activity, i.e. possible receptions of PDCCH control data during that period. When the terminal successfully decodes a PDCCH assignment or grant, it re(starts) the so called inactivity timer. The inactivity timer extends the time during which the terminal further monitors the PDCCH.

The DRX mode may be configured via higher layers (i.e. by RRC). The terminal may thus be configured to use long DRX cycle or the short DRX cycle or both. The terminal always follows one DRX cycle at any moment even if two DRX cycles (i.e. short and long DRX) are configured. The network (i.e. higher/upper layers) can configure a DRX cycle between e.g. 2 ms and up to e.g. 2.56 seconds depending upon the type of service, e.g. 2-20 ms for voice over internet protocol (VoIP) and e.g. 1-2 seconds for browsing on the Internet.

As mentioned before, when DRX is used, the terminal tries to stay inactive as much as possible during the silent periods of the DRX cycle to save its battery. However, this also implies that the terminal will mainly perform measurements at the wake up instances for e.g. mobility reasons; radio link problem detection (e.g. out-of-sync detection and in-sync detection) etc.

A drawback with this is that due to the insufficient measurement opportunities in DRX mode (depending upon DRX cycle) it is possible that the terminal would be unable to promptly detect the radio link problem.

Furthermore, it is likely that a very large number of terminals are kept in DRX mode and the network can abruptly switch one or several terminals to operate in continuous reception mode in order to transmit data. Thus the terminal(s) should stay well connected in terms of radio link quality and so any radio link problem(s) should be reported to the network promptly. In other words, it is important that the radio link problem detection is designed to work effectively in both DRX and non-DRX (i.e. continuous) modes of operation. But since the number of measurements samples that are required to achieve estimation accuracy equivalent to non-DRX mode can be relatively large, a terminal operating in DRX mode may fail to promptly detect radio link problems due to the insufficient measurement opportunities (i.e. evaluation periods) by the terminal in DRX mode.

SUMMARY

It is thus an object of the invention to optimize power consumption and—in case of a battery powered device—battery lifetime. It is a further object of the invention to reduce the complexity of signaling and signaling overhead and thereby reduce energy consumption and/or extend battery lifetime even further. In particular in the framework of machine-type communication (MTC) it is an object of the invention to reduce the complexity of machine-type devices themselves, minimize signaling overhead and extend—in case of battery powered machine type devices—their battery lifetime even further. Another object of the invention is to allow for extended DRX cycles as well as the implementation of a power-saving mode (PSM) with a reduced wake-up time, especially for MTC devices.

According to a first embodiment of the present invention, the above stated object is achieved by a method for monitoring a radio link between a base station and a terminal in a wireless communication system. The method may comprise: adapting at least one parameter, used in monitoring said radio link, based on a duration of an inactive phase. In the inactive phase the terminal may not transmit to and/or receive data from the base station via the radio link.

According to a second embodiment of the present invention, the above stated object is achieved by a computer program comprising program code. The code may be executed by a processor of a terminal. By executing the code the terminal may be configured to operate in accordance with a method of the first embodiment.

According to a third embodiment of the present invention, the above stated object is achieved by a terminal capable of monitoring a radio link between the terminal and a base station. The terminal may be configured to adapt at least one parameter, used in monitoring said radio link, based on a duration of an inactive phase. In the inactive phase the terminal may be configured not to transmit to and/or to receive data from the base station via the radio link.

According to a fourth embodiment of the present invention the above stated object is achieved by a base station for enabling a terminal to monitor a radio link between the terminal and said base station. The terminal may be configured not to transmit to and/or not to receive data from the base station via the radio link in an inactive phase. The base station may be adapted to transmit a first message to the terminal setting a predefined threshold. The predefined threshold may serve for comparing predefined threshold or a parameter adapted accordingly with a duration of said inactive phase.

According to a fifth embodiment of the present invention the above stated object is achieved by a method for use in a base station enabling a terminal to monitor a radio link between the terminal and said base station. The method may comprise the steps of transmitting a message to the terminal setting a predefined threshold for comparing said predefined threshold with a duration of an inactive phase. During the duration of the inactive phase the terminal may be configured not to transmit to and/or not to receive data from the base station via the radio link.

According to a sixth embodiment of the invention the object is achieved by a computer program comprising program code to be executed by a processor of a base station. By executing the code the terminal may be configured to operate in accordance with a method of the fifth embodiment.

An advantage of the embodiments of the present invention is that reliable and especially fast radio problem detection is achieved even when the terminal, which may very well be a machine-type-device (MTC), is operating in DRX mode and/or in a scenario with limited measurement opportunities. Further on it is a benefit of the present invention that power consumption of the terminal is reduced in case of a radio link failure and a subsequent re-establishment procedure.

Further objects and features of the embodiments of the present invention will become apparent from the following detailed description in conjunction with the accompanying drawings. The following drawings are illustrative only, and that various modifications and changes may be made in the specific embodiments illustrated as described within the scope of the appended claims.

BRIEF DESCRIPTION OF THE DRAWINGS

FIG. 2a shows a diagram illustrating an example of a scheme on how to handle radio link failure.

FIG. 2b shows a diagram illustrating another example of a scheme on how to handle radio link failure.

DETAILED DESCRIPTION

In the following description, for purposes of explanation and not limitation, specific details are set forth such as particular architectures, scenarios, techniques, etc. in order to provide a thorough understanding of the exemplary embodiments of the present invention. However, it will be apparent for the person skilled in the art that the exemplary embodiments of the present invention may be practiced in other embodiments that depart from these specific details. The different embodiments of the present invention are described herein by way of reference to particular example scenarios. In particular the embodiments are described in a non-limiting general context in relation to a communications network based on the fourth generation (4G) LTE concept. It should be noted that the embodiments of the present invention are not restricted to LTE but can be applicable in other wireless systems that employ discontinuous reception (DRX) such as UMTS, WiMAX (worldwide interoperability for microwave access), or HSPA (high speed packet access) or WCDMA (wideband code division multiple access) or HSDPA (high speed downlink packet access) or HSUPA (high speed uplink packet access) or other wireless communication techniques.

Figure 1:
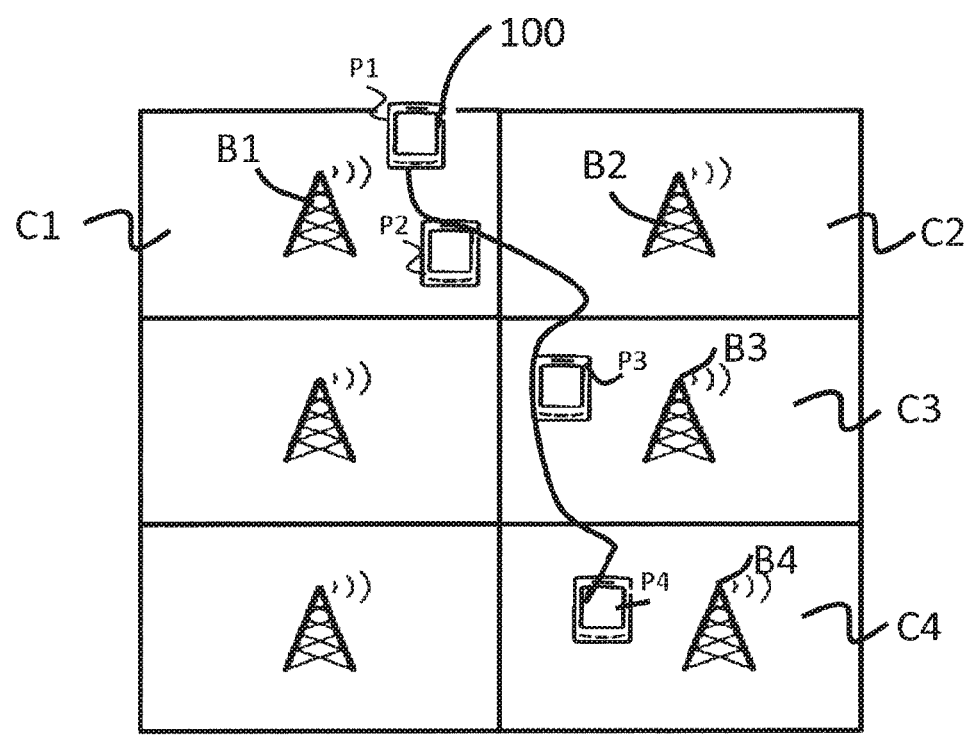
FIG. 1 schematically illustrates a terminal moving through different cells of a cellular network.

FIG. 1 schematically illustrates an embodiment in which a non-stationary terminal 100 moves through different cells C1, C2, C3, C4 of a cellular network. A terminal 100 may be any kind of wireless communication device as for example a user equipment (UE), a MTC-device, a mobile phone, a smartphone, a data modem, a mobile computer, or another kind of terminal device. The cellular network may be a network employed in accordance with a specification of 3GPP. Although the cells are depicted in a rectangular shape in FIG. 1, they may have arbitrary different shapes, for example hexagonal, circular etc.

Since the terminal 100 is non-stationary or portable it may be in different locations, e.g. P1-P4, at different points in time. Therefore the terminal 100 may have to change between the different cells C1-C4. In normal operation, the terminal 100 has to be awake all the time and monitor PDCCH for every subframe, meaning that it has to be awake all the time since it doesn't know exactly when the network will transmit the data, e.g. handover information or any other signaling. Thus the terminal 100 is capable of establishing a perpetual connected mode. The perpetual connected mode may reduce the amount of signaling overhead required by the terminal (device) 100. However power consumption is high in such an operating mode. The terminal 100 may also be capable of establishing an extended discontinuous reception (DRX) cycle. The extended DRX cycle may enable the terminal 100 to reduce energy consumption while maintaining the perpetual connected mode. Remaining in RRC Connected mode or any type of (perpetual) connected mode hence causes less signaling compared to going down to (RRC) Idle mode in between. Connected mode does not give less signaling in itself. Hence the additional signaling is caused by moving from (RRC) idle mode to (RRC) connected mode. The (RRC) idle mode is enabled and/or accessible when the terminal operates according to DRX, e.g. the terminal operates in extended DRX mode.

During discontinuous reception (DRX) the terminal 100 may go into sleep mode for a certain period of time and wake up for another period of time. The duration of a DRX cycle consists of an 'ON time' and an 'OFF time'. DRX provides a number of parameters, such as "onDurationTimer", "drx-Inactivity timer" etc., which allow for adjusting of the different time intervals of DRX mode. In the present case, the 'OFF time' of a DRX cycle corresponds to an inactive phase of the terminal 100. However, other inactive phases, such as switching off the receiver and/or transmitter unit RX, TX of the terminal 100 e.g. due to a power saving mode, extended DRX in idle mode, or when the device is switched off may be available.

Keeping the terminal 100, e.g. a MTC device, constantly in RRC_CONNECTED mode with extended DRX cycles is an ideal scenario to minimize both the RRC signaling overhead and terminal power consumption. This way, even infrequent data transmissions can be handled without any need for connection setup signaling. However, due to the extended DRX cycles and in case the terminal 100 is not stationary, or the network conditions change (e.g., due to HO parameter optimization, antenna tilt optimization, power/interference optimization, base station on/off etc.), the terminal 100 may wake up in the coverage of a cell C3-C4 resp. base station B3-B4 that is different from the original serving cell C1 or base station B1. Such a situation may occur e.g. as depicted in FIG. 1 when the terminal 100 is in the coverage of a first cell C1 at position P1 and P2 but in the coverage of a different cell C3 and C4 at position P3 and P4 respectively. Hence, after being connected to a first cell C1 the terminal 100 may enter an inactive phase, such as DRX 'OFF time', and may wake up from that inactive phase having lost the connection to the first cell C1.

In such a scenario the terminal 100 would follow the following procedures as shown in FIG. 2a to handle radio link failure: In a first phase downlink quality is monitored by Layer 1 and problems indicated to RRC, e.g. the number of unsuccessfully received packets is indicated by a counter N310. RRC filters Layer 1 indications and starts a timer T310 after a number of out-of-sync indications indicated by counter N310. If no recovery within the first phase is made, a second phase is triggered in which Layer 2 monitors random access attempts and indicates problems to RRC. If no recovery is made within the second phase, i.e. within a time interval provided by a timer T311, the terminal 100 autonomously goes into RRC idle mode.

An additional timer T312 may be added. The timer 312 may be introduced to enable faster connection recovery during mobility typically with the help of a shorter timer length than the Radio Link Failure timer T310. T312 may be triggered if T310 is running and a measurement report is triggered for a measurement identity. The measurement report with the measurement identity may then trigger the timer T312. Hence, the triggering is mainly due to a measurement reporting. If the terminal 100 performs a handover, re-establishment procedure, or T310 is stopped, T312 may be stopped too. The expiry of T312 may also trigger radio link failure or a corresponding procedure. Timer T312 may thus be triggered when timer T310 is triggered or after T310 is triggered, that is to say when timer T310 is already running. Preferably timer T312 is configured to expire earlier than timer T310. For example timer T312 may be configured to run for a shorter period of time than timer T310.

Despite the technological developments and the procedures explained in the above, a terminal 100 with extended DRX cycles may however end up with lengthy procedures when it wakes up in another cell C1-C4 or coverage of another base station B1-B4. This would cause unnecessary power consumption (e.g., in processing) and delay (e.g., in access) especially when considering that the timers may be configured much longer for MTC devices (e.g. due to the coverage extension for MTC devices).

An additional or alternative condition for starting the timer T312 or a new timer, e.g. a timer T313, may be employed, e.g. in order to enable fast connection reestablishment that follows an inactive phase, such as a (long) sleep duration e.g. as present in short/extended DRX. This scenario is depicted in FIG. 2b. Thus for example, instead of starting the timer T312 upon a measurement report, timer T312 may be started based on the duration of an inactive phase, e.g. such as the 'OFF time' of an DRX cycle. The inactive phase may be the inactive phase of a directly preceding DRX cycle. However, optionally more than one preceding inactive phase may be taken into account, e.g. of more than one preceding DRX cycle. An exemplary scenario of such a timer T312 or timer T313 as the case may be is depicted in FIG. 2b. Further on, instead or in addition to a timer, a counter may be initiated, started or adapted. Thus, the adaption of a parameter, such as e.g. a counter or a timer, has the benefit of power saving (on the terminal side) and reduced access delay, in particular for machine type-devices.

In a first embodiment, a new condition may be added for triggering the timer T312 or timer T312. Timer T312 and/or timer T313 may be configured shorter than timer T310 and triggered due to a measurement report so as to enable faster connection recovery during mobility—as explained previously. With the addition of a new condition, timer T312 and/or timer T313 may (also) be started when the terminal 100 has been out-of-sync since the end of an inactive phase, e.g. a sleep period or a 'OFF time', which is longer than a predefined time threshold. Starting the timer T312 and/or timer T313 may as well be dependent on that the timer T310 is already running. For instance, this could be the case when the terminal 100 wakes up from an extended sleep/DRX time to periodically check whether there is downlink data/paging or sporadically transmit uplink data. Timer T312 and/or timer T313 may stop upon at least one of the following: receiving a number N311 (maximum number) of consecutive in-sync indications from lower layers, triggering the handover procedure, initiating the connection re-establishment procedure, and/or the expiry of timer T310. At the expiry of timer T312, and if security is not activated: the terminal 100 may go to RRC_IDLE mode, also referred to as (RRC) idle mode. Otherwise, it may initiate a connection re-establishment procedure or to another kind of recovery from radio link failure. The terminal 100 may as well go directly to RRC_idle mode.

Additionally or alternatively to the above, a new timer, e.g. a timer T313, may be introduced. In the first alternative, timer T313 starts upon the end of an inactive phase, such as an extended DRX cycle, and may be configured to run for a shorter duration than timer T310. Timer T313 may thus be started upon a duration of an inactive phase which is longer than a predefined time threshold. This threshold may be set in advance by the terminal vendor or may be received from a base station B1-B4 of the cellular network. By way of the determined and/or predefined threshold the probability of the terminal changing cells (during the inactive phase) may be taken in to account. This probability and thus the determined or predefined threshold may be dependent on e.g. the mobility of the terminal 100, size of an area covered by a cell C1-C4, a device category of the terminal 100 or the like. Additionally or alternatively a QoS (Quality of Service) requirement, an application type, or the like may be used.

In another embodiment timer T313 may additionally or alternatively start when the terminal 100 enters an inactive phase, e.g. 'OFF time', timer T313 may then be adapted, e.g. may be set, to run for a predefined amount of time, e.g. defined by said predefined threshold, denoted as DRX_thr in the following; and/or timer T313 may be set to run for a period of time dependent on the duration of timer T310; and/or timer T313 may be set to run for a period of time dependent on the duration of timer T312. Thus, the predefined threshold DRX_thr may be set and the duration of timer T313 may be adapted based on said threshold or based the duration of another timer.

Timer T313 may stop, in particular upon receiving a number of consecutive in-sync indications determined by counter N311, e.g. from lower layers, upon triggering a handover procedure, upon initiating a connection re-establishment procedure, and/or upon the expiry of timer T310 and/or timer T312. At the expiry of timer T313, and in case security is not activated the terminal may be configured to go into RRC_IDLE mode, which also may be the case at expiry of timer T310 or timer T312. Otherwise, it initiates a connection re-establishment procedure.

According to a further embodiment a RRC connection reestablishment message indicating the reestablishment cause may be send from the terminal 100 to a base station B1-B4. The reestablishment cause may be that the duration of the inactive phase, such as the extended DRX or a sleep time, is longer than a predefined time threshold (e.g., DRX 'OFF time'>DRX_thr [seconds]). This reestablishment message may be sent if the connection re-establishment procedure starts upon the new condition of timer T312 or the new timer T313. The RRC connection reestablishment message may include an information element e.g., an reestablishment cause that indicates the reestablishment cause as the extended DRX or a sleep time that is longer than a predefined time threshold (e.g., DRX>DRX_thr [seconds]).

Figure 3:
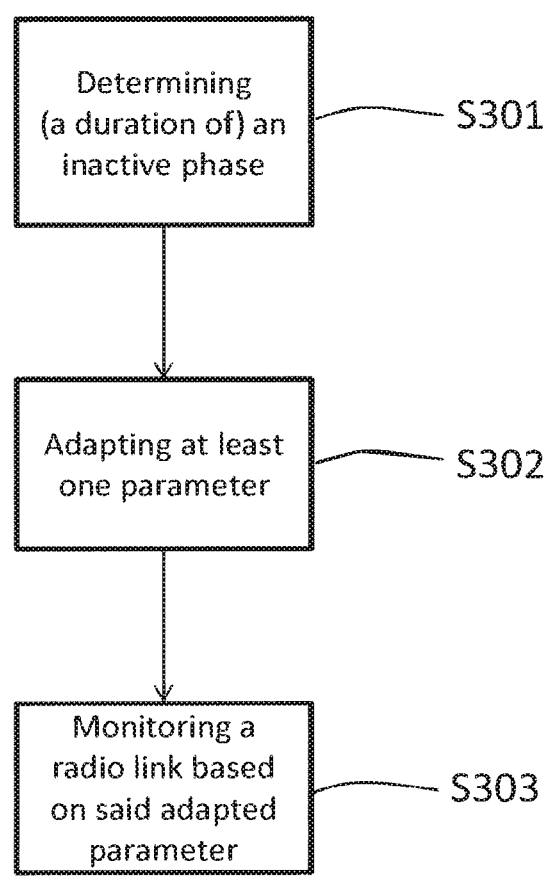
FIG. 3 shows an exemplary flow chart schematically illustrating a method according to an embodiment of the invention with regards to a terminal.

FIG. 3 shows an exemplary flow chart schematically illustrating a method and method steps S301, S302, S303 according to an embodiment of the invention with regard to a terminal 100. That is to say, the method as shown in the flow chart is at least partially or completely performed by the terminal 100 or one or more components of the terminal 100. The terminal 100 may thus be capable of detecting a radio link failure between it and a base station B1-B4, e.g. based on monitoring and/or evaluating the radio link.

The terminal 100 is configured to adapt in step S302 at least one parameter (e.g. initiate a timer, set a starting condition for a timer, set a duration of a timer or initiate a counter, set a starting condition of a counter) used in monitoring said radio link, based on a duration of an inactive phase, in which the terminal 100 is not transmitting to and/or receiving data from the base station B1-B4 via the radio link. The parameter may very well be the above discussed timer T312 and/or timer T313.

The one or more parameter, which may by way of example be a high layer filtering parameter, may be used when monitoring the radio and/or in radio link failure evaluation i.e. used to evaluate and detect radio link failure between the terminal 100 and a (serving) base station B1-B4 (or (serving) eNodeB). The terminal 100 may further on be capable of operating in DRX mode having at least one DRX cycle. Additionally, the method may thus comprise the step S303 of monitoring said radio link based on said at least one adapted parameter after adapting the at least one parameter.

The method may further comprise the step of comparing the duration of said inactive phase with a predefined threshold, and adapting said at least one parameter based on said comparison. As mentioned earlier, the terminal 100 can adapt the parameter(s) as a function of the duration of the inactive phase. The duration of the inactive phase may be determined in a step S301 by the terminal 100 itself or may even be received by a base station. The duration of the inactive phase may then be compared to said predefined threshold, which threshold may for instance be determined in said step S301 by the terminal 100 itself or may be received from a base station B1-B4.

The step S302 of adapting may comprise the step of initiating said parameter based on the duration of said inactive phase.

Preferably the inactive phase is an inactive phase, conventionally denoted as 'OFF time', of a discontinuous reception, DRX, cycle or a discontinuous transmission, DTX, cycle. Thus, the method may further comprise the step of determining the duration of said inactive phase based on the duration of a DRX sleep state of said DRX cycle. Preferably said at least one parameter corresponds to a start time, an end time and/or a duration of said first parameter, which first parameter preferably corresponds to a first time. Additionally, the start time, the end time and/or the duration of said first parameter, preferably said first timer, is adapted as a function of, e.g. the duration, said inactive phase. However instead of a timer or additionally to a timer a counter may be used.

Optionally, the method further comprises the step of monitoring comprises, monitoring the radio link between the terminal 100 and the base station B1-B4 while said first timer is running.

The step of adapting may further comprise at least one of the following steps initiating said first timer, e.g. timer T312 or timer T313, based on the duration of said inactive phase, initiating said first timer in case the duration of said inactive phase exceeds said predefined threshold, initiating said first timer in case the terminal has been out-of-sync, e.g. after a number of out-of-sync indications, preferably after the end of a directly preceding inactive phase, starting said first timer after said inactive phase, preferably at the end of said inactive phase, starting said first timer at the beginning of said inactive phase.

The method may further comprise the step of running said first timer at least partly in parallel to a second timer.

In particular the step of adapting said first parameter, e.g. said first timer, may comprise adapting said first parameter to run for a shorter period of time than said second timer. The first timer may thus be adapted to lapse before said second timer. This may be achieved starting the first timer at a point of time before or equal to a point of time starting the said second timer According to an embodiment of the method said second timer corresponds to a timer for evaluating a radio link failure. However, also the first timer may correspond to a timer for evaluating a radio link failure and/or monitoring said radio link.

The method may further comprise the step of evaluating a radio link failure based on monitoring said radio link while said first timer is running. This may be achieved by observing out-of-sync between the terminal and the base station in order to evaluate radio link failure detection according to said parameter. This may be achieved by using a parameter such as a timer and/or a counter. Thus, the at least one first and/or the at least one second parameter may be a timer, a counter or a combination thereof.

The step of determining the threshold may further comprise the step of determining said threshold, e.g. out of a plurality of available predefined thresholds. For example only a limited amount of predefined thresholds may be available. One of those predefined thresholds may be selected in order to serve a threshold to compare the duration of the inactive phase with said selected threshold. For example, a certain threshold may be selected according to a device category of the terminal.

The method may additionally comprise the step of transmitting a message, e.g. containing radio link failure information, from the terminal indicating that said predefined threshold has been exceeded. This message may be transmitted after the step of comparing the duration of said inactive phase with said predefined threshold. The result of this comparison may then be included in that message.

The method may further comprise the step of initiating a connection re-establishment procedure after the first timer has expired.

Figure 4:
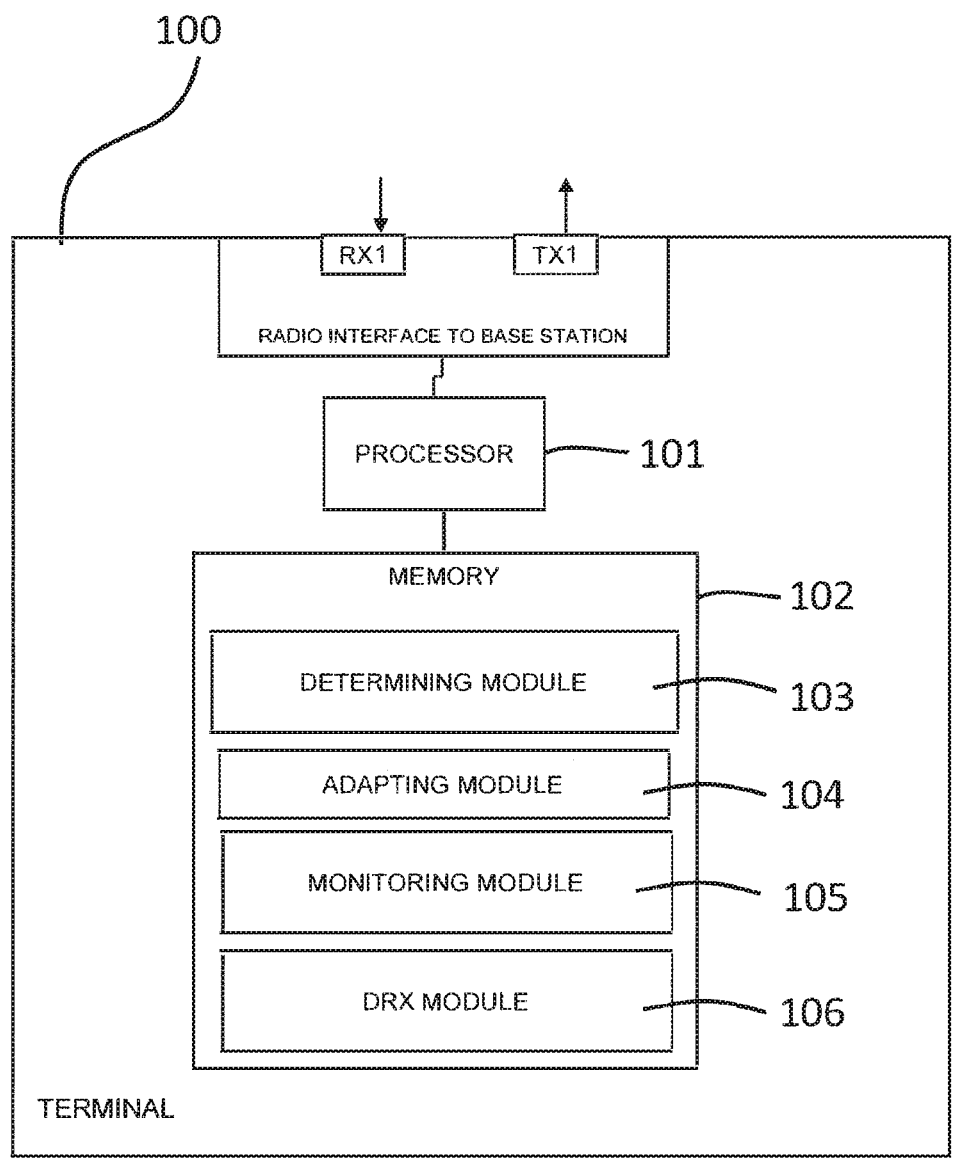
FIG. 4 shows a flow chart schematically illustrating a method according to an embodiment with regard to a base station.

Now referring to FIG. 4, there is illustrated an exemplary structure of an exemplary terminal 100 for performing the method of FIG. 3 and/or the different previously described embodiments. As shown, the terminal 100 includes a DRX module comprising means for enabling the terminal 100 to operate in a DRX mode having at least one DRX cycle (e.g. short or long etc.); a processor comprising means for adapting the one or more parameter (i.e. higher layer filtering parameters such as counters and/or timers) as a function of, e.g. the duration of, the inactive phase of the DRX cycle the terminal 100 is using; and a monitoring module comprising means for monitoring a radio link based on the one or several adapted parameters. The monitoring module may additionally comprise means for evaluating radio link failure detection based on the one or several adapted parameters. The terminal 100 may further comprise a receiver unit RX adapted to receive radio signals via a radio link to one or more base station B1-B4, e.g. of a cellular network. The receiver unit RX may further be adapted to receive a configuration message (or messages) from a base station B1-B4. Such message(s) may comprise one or more predefined thresholds which the terminal 100 can be used to compare the duration of one of the preceding inactive phases, e.g. of one or more preceding DRX cycle, that is used by terminal 100. The terminal 100 further includes a transmitter unit TX adapted to transmit to the base station B1-B4 information related to radio link conditions after monitoring and/or evaluating the radio link, e.g. by way of the monitoring module, for example based on one or more adapted parameter. The different exemplary modules and units shown in FIG. 4 are not necessarily separated. Furthermore the transmitter unit TX and the receiver unit RX may also be realized in one and the same unit. The terminal 100 is therefore not restricted and is not limited to the exemplary block diagrams shown in FIG. 4. In addition, the terminal 100 may also comprise other elements and/or units not illustrated in FIG. 4.

The terminal 100 may thus be capable of monitoring a radio link between the terminal 100 and a base station B1-B4, and may be configured to adapt at least one parameter, used in monitoring said radio link, based on a duration of an inactive phase, in which the terminal is not transmitting to and/or receiving data from the base station via the radio link. The terminal 100 may further be configured to monitor said radio link based on said at least one adapted parameter. The terminal 100 may be adapted to compare a duration of said inactive phase with a predefined threshold, e.g. by way of the determining module. The terminal 100 may further be capable to adapt at least one parameter based on said comparison, e.g. by way of the adapting module.

The terminal 100 may thus comprise a processor; and a memory, said memory containing instructions executable by said processor, whereby said terminal is operative to: compare a duration of an inactive phase, in which the terminal 100 is not transmitting to and/or receiving data from the base station B1-B4 via the radio link, with a predefined threshold, and adapt at least one parameter based on said comparison, and monitor said radio link based on said at least one adapted parameter.

The terminal 100 may comprise a receiver unit RX and/or transmitter unit TX transmitting and/or receiving data from said base station as the case may be. The terminal 100 may thus be adapted to switch off the receiver unit and/or transmitter unit RX, TX during the inactive phase. This may be achieved by said DRX module as depicted in FIG. 4.

The terminal 100 may optionally be adapted to operate in discontinuous reception, DRX, or discontinuous transmission, DTX, mode and/or to determine the duration of said inactive phase based on the duration of a DRX or DTX sleep state, i.e. 'OFF time', of said DRX or DTX mode.

The at least one parameter adapted and/or deployed during monitoring said radio link may correspond to a first timer, which first timer is preferably adapted as a function of said at least one inactive phase, and/or wherein said terminal is adapted to monitor the radio link between the terminal and the base station while said first timer is running. Instead of a timer said first parameter may also be a counter. Besides a plurality of parameters may be adapted and/or employed during monitoring said radio link. For example, a first parameter may be a timer, as described above, and a second parameter may be counter, as described above as well. For example the first timer may be the timer T312 or timer 313 as described in the above.

Additionally, the terminal 100 may configured to adapt said first timer by scaling the duration of the inactive phase, e.g. using a scaling factor, and/or said terminal is configured to start said first timer in case said inactive phase exceeds said predefined threshold, and/or said terminal is configured to start said first timer after a preceding inactive phase, preferably at the end of a directly preceding inactive phase, and/or said terminal is configured to start said first timer if the terminal 100 has been out-of-sync, e.g. after a number of out-of-sync indications, preferably after the end of a directly preceding inactive phase, and/or said terminal 100 is configured to start said first timer at the beginning of said inactive phase.

Optionally, said terminal 100 is configured to run said first timer at least for a time in parallel to a second timer, wherein preferably said first timer is initialized to run for a shorter period of time than said second timer, wherein in particular said second timer corresponds to a timer for evaluating a radio link failure after a number of out-of-sync indications.

The terminal 100 may also be configured to evaluate a radio link failure based on monitoring said radio link while said first timer is running, and/or said terminal is configured to observe out-of-sync between the terminal and the base station in order to evaluate radio link failure detection according to said parameter.

Further on, the terminal 100 may be configured to determine said predefined threshold, e.g. out of a plurality of available predefined thresholds, according to a device class of the terminal 100, and/or said terminal is configured to transmit a message, e.g. containing radio link failure information, from the terminal that indicates that said predefined threshold has been exceeded, and/or said terminal is configured to initiate a connection re-establishment procedure after the first timer has expired.

Figure 5:
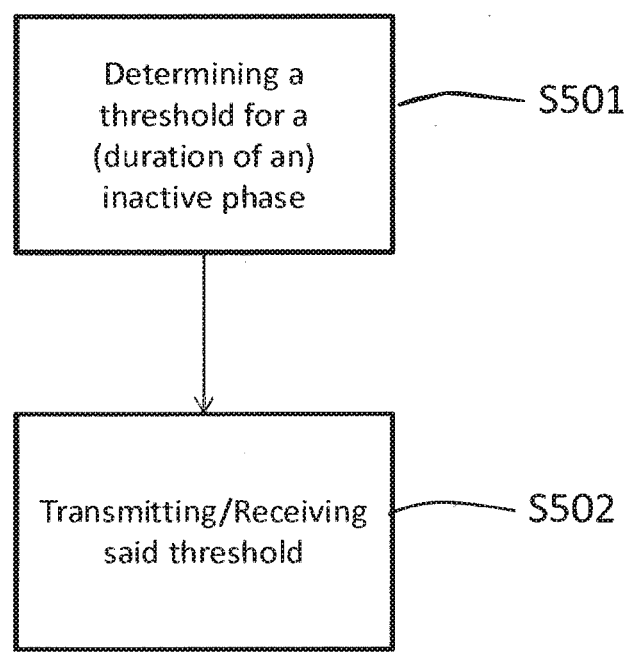
FIG. 5 schematically illustrates exemplary structures for implementing an embodiment in a terminal.

Now referring to FIG. 5, there is illustrated a flowchart of a method and method steps S501, S502, performed by a base station (e.g. eNodeB or eNB) B1-B4 for enabling a terminal 100 to adapt a parameter, monitor a radio link and/or detect radio link failure between the terminal and the base station. The terminal 100 is capable of operating in DRX mode having at least one DRX cycle. As shown in FIG. 5, the main steps performed in the base station comprise: transmitting (or signaling) a threshold to the terminal, in a step S502, on the basis of which one or several parameters are adapted, e.g. as a function of the threshold, and/or for comparing said predefined threshold with the duration of an inactive phase, e.g. of the current DRX cycle. The one or several parameters (i.e. high layer filtering parameters such as timers and counters) may be used when monitoring said radio link or in radio link failure evaluation.

Optionally the base station B1-B4 may receive from the terminal 100 information relating to a reporting on radio link conditions, after that the terminal 100 has evaluated the radio link failure (RLF) detection based on the adapted parameter(s).

Thus, a method according to the present invention may be used in a base station B1-B4 and enabling a terminal 100 to monitor a radio link between the terminal 100 and said base station B1-B4, the method comprising: transmitting a message to the terminal setting a predefined threshold for comparing said predefined threshold with a duration of an inactive phase, during which inactive phase the terminal is not transmitting to and/or receiving data from the base station via the radio link.

Said threshold may be determined by the base station B1-B4 in a step S501. As already mentioned the area covered by a cell or base station and/or a device category or the like may be taken into account when determining said threshold.

Figure 6:
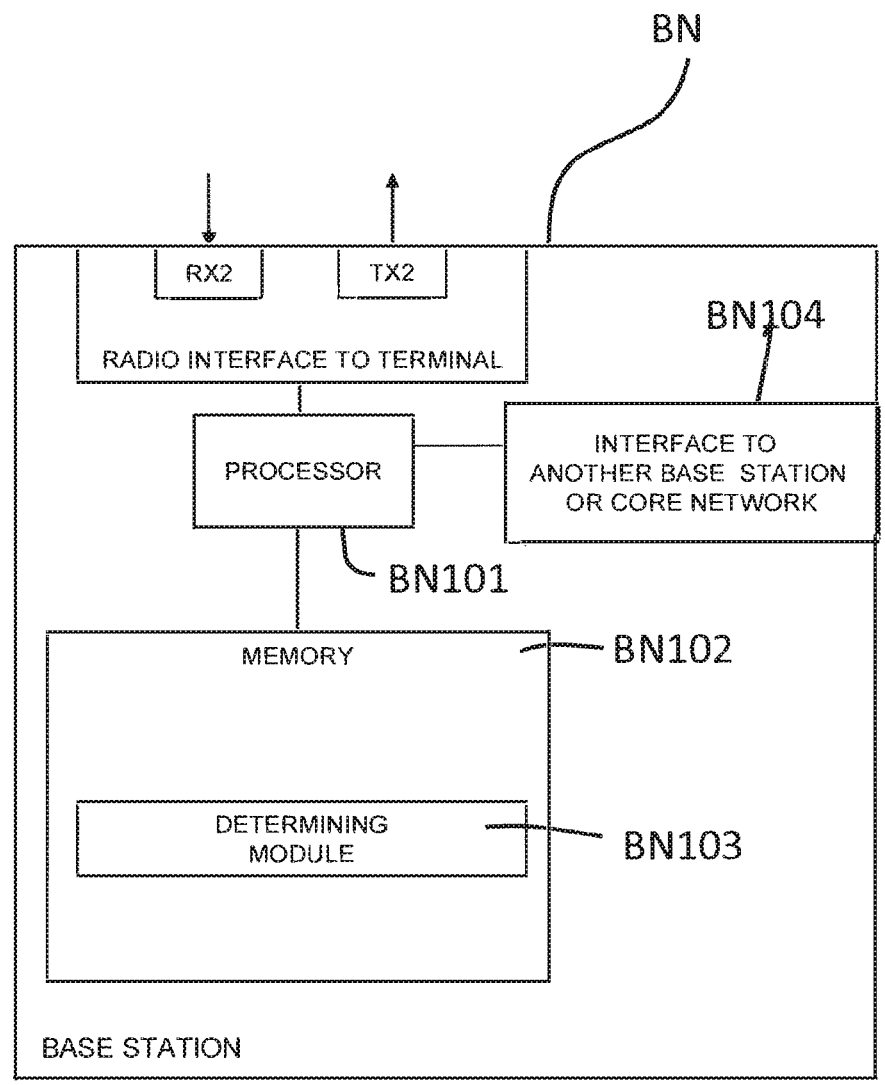
FIG. 6 schematically illustrates exemplary structures for implementing an embodiment in a base station.

Referring to FIG. 6, exemplary structures of a base station BN (e.g. eNodeB or eNB) for enabling a terminal 100 to adapt a parameter, monitor a radio link and/or detect radio link failure between the terminal 100 and the base station BN are illustrated. The terminal 100 may be configured to adapt at least one parameter used to monitor a radio link, evaluate and detect radio link failure between it and the base station BN. As mentioned before, the terminal 100 may be configured to operate in DRX mode having at least one DRX cycle (long or short). As shown in FIG. 6, the base station BN includes a transmitter unit TX comprising transmitting means that is configured to transmit (or signal) a threshold to the terminal. The terminal 100 can then use the received threshold to adapt the one or several parameters as a function of the threshold and/or as a function of the length or duration or period of the inactive phase of a current DRX cycle. Additionally the terminal 100 may be adapted to compare the received threshold with the duration of an inactive phase. The threshold may e.g. be sent to the terminal 100 in a configuration message.

The base station BN further includes a receiver unit RX comprising receiving means configured to receive, after evaluation by the terminal 100 of the radio link based on the adapted parameter(s), information relating to a reporting on radio link conditions. Note that the different exemplary units shown in FIG. 6 are not necessarily separated. The base station BN may also include a processor comprising processing means for e.g. processing information received/transmitted from/to one or several terminals. Although the base station may comprise additional elements and/or units such as integrated circuits and discrete components which are known by a person skilled in the art, these additional elements and units are not illustrated in FIG. 6.

Thus, an embodiment comprises a base station BN for enabling a terminal 100 to monitor a radio link between the terminal 100 and said base station BN, the terminal 100 comprising an inactive phase, in which the terminal 100 is not transmitting to and/or receiving data from the base station BN via the radio link, said base station BN being adapted to transmit a first message to the terminal setting a predefined threshold for comparing said predefined threshold with a duration of said inactive phase.

Optionally, the base station BN is adapted to transmit a second message to the terminal 100 setting a duration of said inactive phase. Further on, said base station may be adapted to determine a duration of said inactive phase and/or said threshold based on a device category of said terminal 100. On or more of the base station according to FIG. 1 may be embodied in a way corresponding to the exemplary base station BN of FIG. 6.

Figure 7:
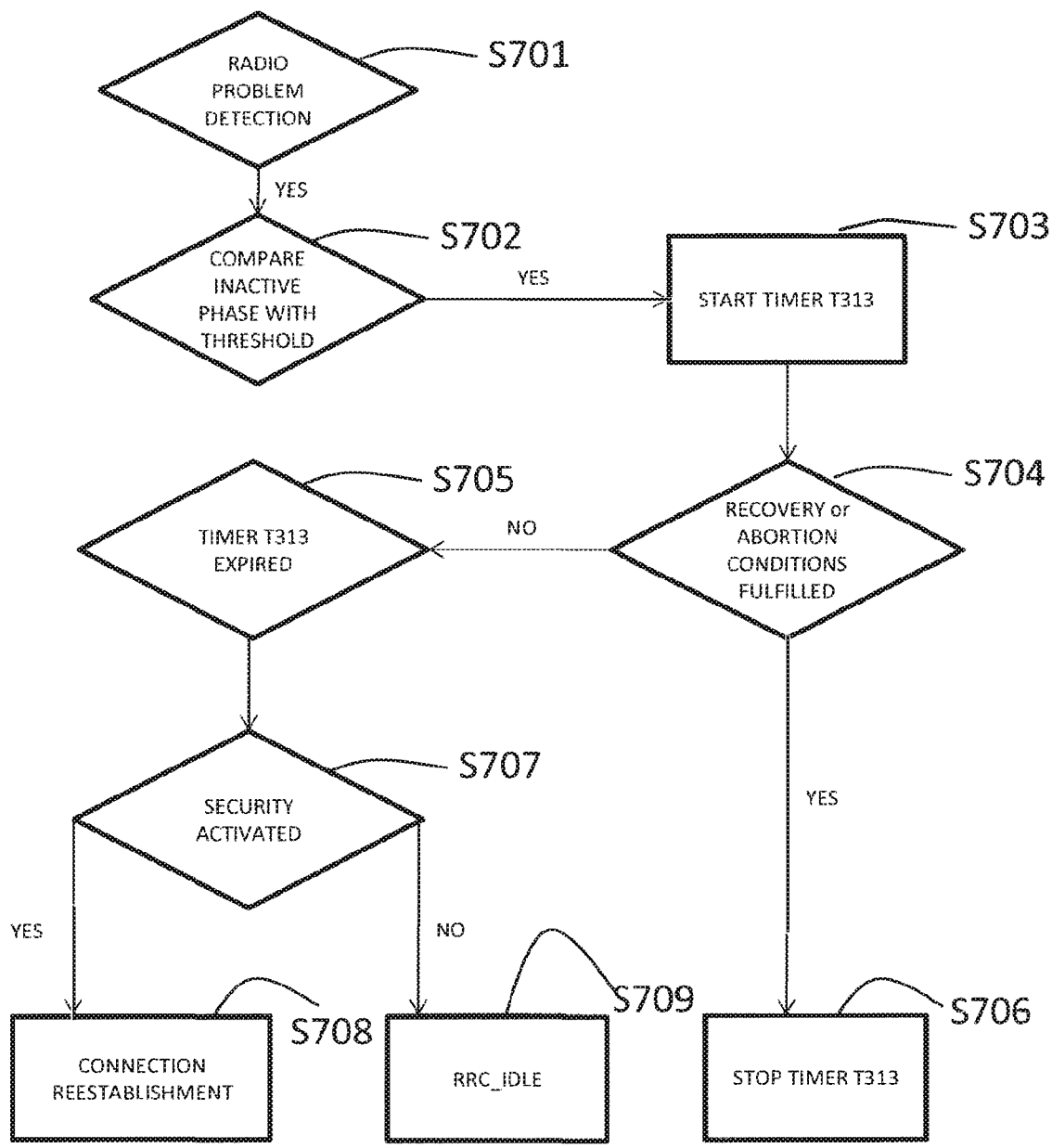
FIG. 7 schematically illustrates another flow chart diagram for implementing an embodiment in a terminal.

Now referring to FIG. 7, a flow chart diagram for implementing a further embodiment is schematically illustrated.

In case a radio problem has been detected in a step S701 the duration of a previous inactive phase is compared with a predefined threshold in a step S702. The radio problem detection may be based on a number of unsuccessful decodings of received data packets, e.g. accounted for by a counter N310. If this number is exceeded a radio link failure is detected. Subsequently, the duration of the inactive phase is compared with said predefined threshold. In case the inactive phase is longer than the threshold, i.e. exceeds said threshold, a timer, e.g. timer T313, is started. Thus, in the embodiment of FIG. 7 the timer T313 is started after the radio problem detection in a step S703. However, the timer T313 may be started directly after the end of the inactive phase, i.e. after switching of the receiver unit RX(and receiving data packets). Alternatively, the timer T313 may be started at the beginning of the inactive phase or after a recovery interval, cf. timer T310 in FIG. 1. Thus, step S702 may be executed e.g. after waking up from an inactive phase such as a (long) DRX cycle, in particular of a mobile MTC devices.).

After timer T313 has been started it is examined whether one or more recovery or abortion conditions are fulfilled in a step S704. Such conditions may be by way of example a number of in-sync indications, for which e.g. a counter like N311, can be used; a handover or connection re-establishment command is received by the terminal; another timer, e.g. timer T310 or timer T312, expired in the meantime. Accordingly, timer T313 may then be stopped in a step S706.

If during the runtime of timer T313 no recovery or abortion has been achieved the terminal may initiate a connection re-establishment procedure or go to RRC_IDLE mode. This may include monitoring the runtime and expiration of the timer T313 in a step S705. Hence, after timer T313 expired the terminal may initiate a connection re-establishment procedure in a step S708 or got RRC_IDLE mode in a step S709. Additionally, after expiration of timer T313 it may be checked whether (AS) security or another type of secure communication has been active in a step S707. For example, if security has been activated a connection re-establishment procedure may be initiated whereas in case security has not been activated the terminal may go into RRC_IDLE state directly.

By setting the runtime of timer T313 to a shorter duration than runtime of timer T310 and/or T311 or by setting the timer T313 to expire earlier than timer T310 or timer T311 radio link failure may detected faster than previously possible. In the flowchart diagram of FIG. 7 timer T310 may be started upon detection of a radio problem, whereas timer T311 may be started after expiry of timer T310 or may be started together with timer T313 or even after timer T313 has been started. However, instead of a new timer T313 a timer already present in the 3GPP specification, e.g. timer T312, may be used in order to monitor said radio link.

Figure 8:
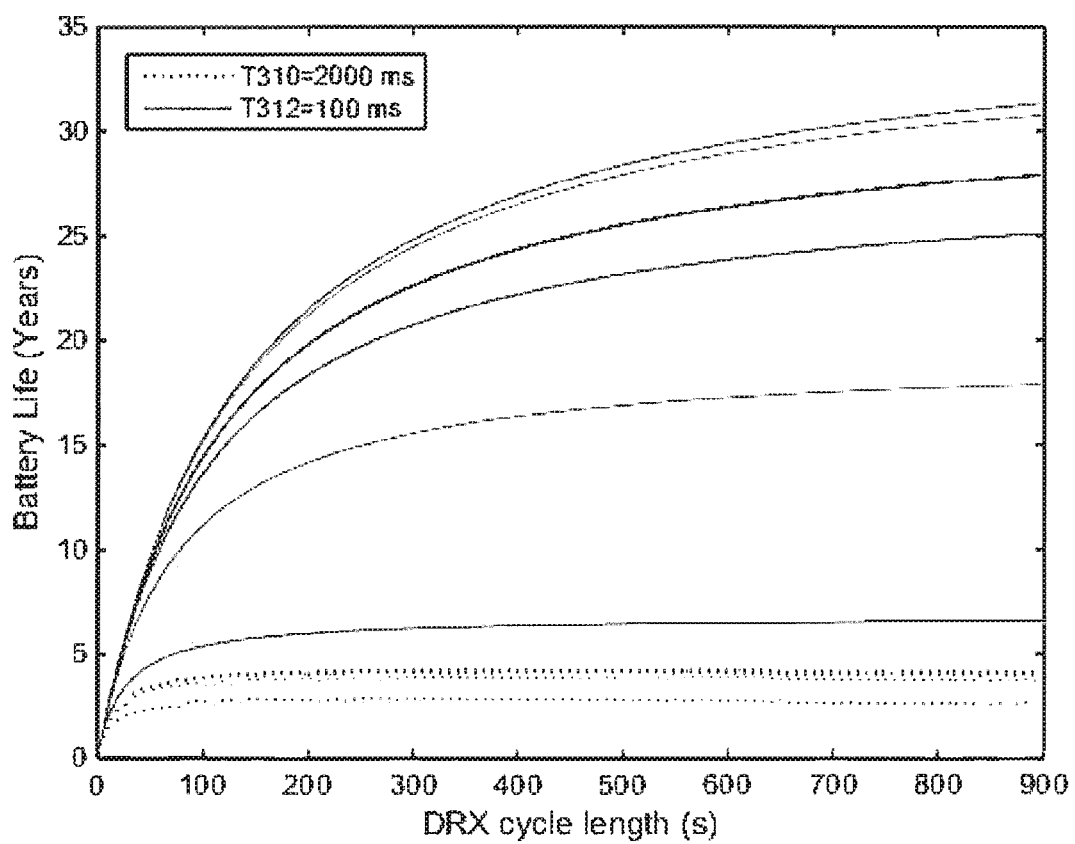
FIG. 8 shows a diagram illustrating battery lifetime as a function of DRX cycle length comparing the conventional method with the present invention.

FIG. 8 shows a plot of battery runtime of a terminal as a function of DRX cycle length, in seconds (s), in the case that the terminal leaves the coverage area of a cell every 30 minutes. The plot has been made for timer settings of 2000 ms for T310 and 100 ms for T312. The dotted lines correspond to the battery runtime for conventional radio link monitoring which is done (only) based on timer T310 which is started upon detection of a radio link problem and/or end of an inactive phase, whereas the solid lines correspond to a radio link monitoring in which a timer adapted according to the length of the inactive phase is employed. The timer is denoted as T312 in this embodiment but may however be the timer T313 as described in the above. The different lines correspond to different inter-arrival times, as indicated in FIG. 8, of an uplink payload of 125 Byte, and based on that the terminal listens to paging of a base station, e.g. during a DRX 'ON time'. The same inter-arrival times have also been used for the conventional radio link monitoring (dotted lines).

Timer T312 is in this case started at the same point in time as timer T310 and is set to run for a shorter duration than timer T310, as indicated above. However, timer T312 is only started in case the DRX 'OFF time' exceeds a predefined threshold. The combination of the predefined threshold and the reduced runtime of timer T312 yields a significant reduction of power consumption and thus in case of a battery powered terminal 100 to an extended battery life.

The above described embodiments can be realized in many ways. As an example, suitable processors in associations with software and hardware means may be used to implement the method claims related to the terminal and the method claims related to the base station. For example, one embodiment includes a computer-readable medium having instructions stored thereon that are executable by a terminal. The instructions when executed perform the method steps related to the terminal as set forth in the claims.

Furthermore, the exemplary embodiments of the present invention may be implemented in any type of wireless communications system that employs DRX modes of operation. By way of example, the exemplary embodiments of the present invention may be implemented in a non-limiting general context in relation to a 4G LTE concept and/or UMTS and/or WiMAX and/or HSPA and/or HSDPA (high speed downlink packet access) and/or HSUPA.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the embodiments of the present invention.

The invention claimed is:

1. A method for monitoring a radio link between a base station and a terminal in a wireless communication system, comprising:
    setting a start time of a first timer for radio link failure recovery, which is used in monitoring the radio link, based on a duration of an inactive phase in which the terminal is not transmitting to and/or receiving data from the base station via the radio link.

2. The method of claim 1, further comprising:
monitoring the radio link based on the start time of the first timer for radio link failure recovery.

3. The method of claim 1, further comprising:
comparing the duration of the inactive phase with a predefined threshold,
wherein setting the start time of the first timer is based on the comparison.

4. The method of claim 1,
wherein the inactive phase is an inactive phase of a discontinuous reception, DRX, cycle or a discontinuous transmission, DTX, cycle.

5. The method of claim 1, further comprising:
determining the duration of the inactive phase based on the duration of a DRX sleep state of the DRX cycle.

6. The method of claim 1,
wherein the start time of the first timer is adapted as a function of the inactive phase.

7. The method of claim 1,
wherein monitoring the radio link comprises, monitoring the radio link between the terminal and the base station while the first timer is running.

8. The method of claim 1,
wherein setting the start time of the first timer comprises initiating the first timer in case the duration of the inactive phase exceeds the predefined threshold.

9. The method of claim 1,
wherein setting the start time of the first timer comprises initiating the first timer in response to the terminal being out-of-sync after a number of out-of-sync indications, and after the end of a directly preceding inactive phase.

10. The method of claim 1,
wherein setting the start time of the first timer comprises starting the first timer after the inactive phase, and at the end of the inactive phase.

11. The method of claim 10,
wherein the second timer corresponds to a timer for evaluating a radio link failure.

12. The method of claim 1,
wherein setting the start time of the first timer comprises starting the first timer at the beginning of the inactive phase.

13. The method of claim 1, further comprising:
running the first timer at least partly in parallel to a second timer.

14. The method of claim 13, further comprising:
adapting the first timer to run for a shorter period of time than the second timer.

15. The method of claim 14, further comprising:
adapting the first timer to lapse before the second timer.

16. The method of claim 1, further comprising:
evaluating a radio link failure based on monitoring the radio link while the first timer is running.

17. The method of claim 1, further comprising:
observing out-of-sync between the terminal and the base station in order to evaluate radio link failure detection according to the parameter.

18. The method of claim 1, further comprising:
determining the predefined threshold, out of a plurality of available predefined thresholds, according to a device category of the terminal.

19. The method of claim 1, further comprising:
transmitting a message, including radio link failure information, from the terminal indicating that the predefined threshold has been exceeded.

20. The method of claim 1, further comprising:
initiating a connection re-establishment procedure after the first timer has expired.

21. A terminal capable of monitoring a radio link between the terminal and a base station, the terminal comprising:
a processor; and
memory having instructions stored therein that are executable by the processor to cause the terminal to perform operations, the operations comprising:
    setting a start time of a first timer for radio link failure recovery, which is used in monitoring the radio link, based on a duration of an inactive phase in which the terminal is not transmitting to and/or receiving data from the base station via the radio link.

22. The terminal of claim 21, the operations further comprising:
monitoring the radio link based on the start time of the first timer for radio link failure recovery.

23. The terminal of claim 22, the operations further comprising:
determining the predefined threshold, out of a plurality of available predefined thresholds, according to a device class of the terminal;

transmitting a message, including radio link failure information, from the terminal that indicates that the predefined threshold has been exceeded; and initiating a connection re-establishment procedure after the first timer has expired.

24. The terminal of claim 21, the operations further comprising:

comparing a duration of the inactive phase with a predefined threshold, wherein setting the start time of the first timer comprises setting the start time of the first timer based on the comparison.

25. The terminal of claim 21, further comprising:

a receiver unit configured to receive data from the base station; and/or a transmitter unit configured to transmit data from the base station.

26. The terminal of claim 25, the operations further comprising:

switching off the receiver unit and/or the transmitter unit during the inactive phase.

27. The terminal of claim 21, the operations further comprising:

operating in a discontinuous reception ("DRX") mode or a discontinuous transmission ("DTX") mode; and determining the duration of the inactive phase based on the duration of a DRX or a DTX sleep state of the DRX mode or the DTX mode.

28. The terminal of claim 21, the operations further comprising:

monitoring the radio link between the terminal and the base station while the first timer is running.

29. The terminal of claim 21, the operations further comprising:

adapting the first timer by scaling the duration of the inactive phase using a scaling factor;

starting the first timer in response to the inactive phase exceeding the predefined threshold;

starting the first timer after a preceding inactive phase, and at the end of a directly preceding inactive phase;

starting the first timer in response to determining that the terminal is out-of-sync and after the end of a directly preceding inactive phase; and starting the first timer at the beginning of the inactive phase.

30. The terminal of claim 29, the operations further comprising:

running the first timer at least for a time in parallel to a second timer; and initializing the first timer to run for a shorter period of time than the second timer, wherein the second timer corresponds to a timer for evaluating a radio link failure after a number of out-of-sync indications.

31. The terminal of claim 21, the operations further comprising:

evaluating a radio link failure based on monitoring the radio link while the first timer is running; and observing out-of-sync between the terminal and the base station in order to evaluate radio link failure detection according to the parameter.

32. A non-transitory computer-readable medium having instructions stored therein that are executable by a processor of a terminal to cause the terminal to perform operations, the operations comprising:

setting a start time of a first timer for radio link failure recovery, which is used in monitoring the radio link, based on a duration of an inactive phase in which the terminal is not transmitting to and/or receiving data from the base station via the radio link.

33. The non-transitory computer-readable medium of claim 32, wherein setting the start time of the first comprises starting the first timer at the beginning of the inactive phase.

* * * * *

UNITED STATES PATENT AND TRADEMARK OFFICE
CERTIFICATE OF CORRECTION

| | | |
|---|---|---|
| PATENT NO. | : 10,827,426 B2 | Page 1 of 1 |
| APPLICATION NO. | : 15/580398 | |
| DATED | : November 3, 2020 | |
| INVENTOR(S) | : Yilmaz et al. | |

It is certified that error appears in the above-identified patent and that said Letters Patent is hereby corrected as shown below:

In the Specification

In Column 10, Line 24, delete "timer" and insert -- timer. --, therefor.

In Column 14, Line 7, delete "RX(and" and insert -- RX (and --, therefor.

In the Claims

In Column 18, Line 36, in Claim 33, delete "first comprises" and insert -- first timer comprises --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*